United States Patent
Oh et al.

(10) Patent No.: US 9,108,623 B2
(45) Date of Patent: Aug. 18, 2015

(54) SYSTEM AND METHOD OF CONTROLLING MOTOR VEHICLE OPERATION

(71) Applicants: Hyundai Motor Company, Seoul (KR); Kia Motors Corporation, Seoul (KR)

(72) Inventors: Jonghan Oh, Gyeonggi-do (KR); Jeongeun Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 233 days.

(21) Appl. No.: 13/659,225

(22) Filed: Oct. 24, 2012

(65) Prior Publication Data

US 2013/0103282 A1 Apr. 25, 2013

(30) Foreign Application Priority Data

Oct. 25, 2011 (KR) .................. 10-2011-0109566

(51) Int. Cl.
| | |
|---|---|
| *B60W 10/04* | (2006.01) |
| *B60W 10/06* | (2006.01) |
| *B60W 10/08* | (2006.01) |
| *B60W 20/00* | (2006.01) |
| *B60K 26/04* | (2006.01) |

(52) U.S. Cl.
CPC ............ *B60W 10/06* (2013.01); *B60K 26/04* (2013.01); *B60W 10/08* (2013.01); *B60W 20/00* (2013.01); *B60K 2026/046* (2013.01); *B60W 2540/10* (2013.01); *B60W 2710/105* (2013.01); *Y02T 10/6286* (2013.01)

(58) Field of Classification Search
CPC ...... B60K 26/04; B60W 10/06; B60W 10/08; B60W 20/00
See application file for complete search history.

(56) References Cited

U.S. PATENT DOCUMENTS

| | | | | |
|---|---|---|---|---|
| 7,617,893 | B2 * | 11/2009 | Syed et al. ............. | 180/65.21 |
| 7,856,305 | B2 * | 12/2010 | Eiraku ...................... | 701/103 |
| 8,170,736 | B2 * | 5/2012 | Muta ......................... | 701/22 |
| 8,321,115 | B2 * | 11/2012 | Oral .......................... | 701/85 |
| 2011/0010031 | A1 * | 1/2011 | Syed et al. ............... | 701/22 |

FOREIGN PATENT DOCUMENTS

| | | |
|---|---|---|
| JP | 07174042 A | 7/1995 |
| JP | 2864904 B2 | 3/1999 |
| JP | 3214172 B2 | 10/2001 |
| JP | 2008-049886 A | 3/2008 |
| JP | 2009067216 A | 4/2009 |
| KR | 10-0992635 B1 | 11/2010 |

\* cited by examiner

*Primary Examiner* — John Q Nguyen
*Assistant Examiner* — Alan D Hutchinson
(74) *Attorney, Agent, or Firm* — Mintz Levin Cohn Ferris Glovsky and Popeo, P.C.; Peter F. Corless

(57) ABSTRACT

The present disclosure provides a system and a method of controlling motor vehicle operation. The method may include: setting a creep torque as a minimum torque; setting a maximum torque as a sum of a maximum torque of an engine and a maximum torque of a motor; monitoring an acceleration pedal position sensor (APS) value; calculating a demand torque according to the APS value; setting a filter coefficient for filtering the demand torque according to an operating condition of the vehicle; and filtering the demand torque by means of the filter coefficient.

4 Claims, 4 Drawing Sheets

SYSTEM AND METHOD OF CONTROLLING MOTOR VEHICLE OPERATION

CROSS-REFERENCE TO RELATED APPLICATION

This application claims under 35 U.S.C. §119(a) priority to, and the benefit of, Korean Patent Application No. 10-2011-0109566 filed in the Korean Intellectual Property Office on Oct. 25, 2011, the entire contents of which are incorporated herein by reference.

BACKGROUND OF THE INVENTION (a) Field of the Invention

The present invention relates to a system and a method of controlling the operation of a motor vehicle. More particularly, the present invention relates to a system and a method of controlling the operation of a hybrid motor vehicle that changes a filter coefficient for determining a demand torque desired by a driver according to the current driving condition of the vehicle.

(b) Description of the Related Art

In developing logic for controlling the operation of a hybrid vehicle, logic that calculates a demand torque for a driver should reflect the driver's intention precisely. The intention of the driver with respect to hybrid vehicle operation parameters such as, for example, acceleration, deceleration, maintaining a speed, etc., should be carried out by the logic so as to drive the vehicle in the manner the driver requests. If the logic calculates a demand torque that does not fully reflect the intention of the driver, then the vehicle will be driven in a manner different from the intention of the driver. Consequently, drivability of the vehicle may be decreased, while the risk of an accident increases. In view of the foregoing, it is clear that it is important to ensure that the logic calculates the demand torque for the driver's request precisely.

Generally, the driver's request may be understood based on data values detected by an acceleration pedal position sensor (APS) and a brake pedal position sensor (BPS). An acceleration torque may be calculated by multiplying a sum of a minimum torque and a maximum torque, and the value detected by the APS. As shown in FIG. 1, if the minimum torque is −60 Nm, the maximum torque is 200 Nm, and the value detected by the APS is 50%, the acceleration torque is 70 Nm ((−60+200)*0.5). In addition, a deceleration torque may be calculated based on the value detected by the BPS. That is, the regenerative braking amount and hydraulic braking amount may be determined based on the value detected by the BPS, and the deceleration torque is calculated according to the regenerative braking amount and the hydraulic braking amount from a predetermined function.

If the driver wants to accelerate, the acceleration torque may be increased proportionally to the value detected by the APS. On the other hand, if the driver wants to decelerate, the value detected by the BPS increases. The demand torque that corresponds to the driver's request, and is suitable for the current operation of the vehicle, may be calculated by considering the current gear and vehicle speed, in addition to the values detected by the APS and the BPS. When calculating the demand torque for the driver's request, the demand torque should be filtered so as not to be changed too rapidly, and the filtered demand torque should be controlled so as not to deviate from the driver's request. In addition, the demand torque should not be calculated by filtering the demand torque excessively or else it may differ from the driver's request.

According to the conventional method for calculating a demand torque, the creep torque may be set as the minimum torque that allows vehicle creeping when the value detected by the APS is 0%, and the sum of the maximum engine torque and the maximum motor torque may be set as the maximum torque. In other words, the minimum torque is the torque when the APS value is 0%, and the maximum torque is the torque when the APS value is 100%. The demand acceleration torque is calculated according to the vehicle speed and the APS value, and the calculated demand acceleration torque is filtered by a constant filter coefficient so as not to be changed too rapidly. Unfortunately, the conventional art filters the demand torque with a constant filter coefficient as shown in FIG. 1, which means that the current driving condition is not fully reflected by the resulting filtered demand torque. For example, when a signal is input from a traction control system (TCS) or an electronic stability program (ESP), the demand torque should directly reflect the intention of the driver quickly for safety. However, since the conventional art implements a filter coefficient with a fixed value, the current driving condition is not accurately reflected quickly in the demand torque response, and the driver may not be able to operate the vehicle safely.

SUMMARY OF THE INVENTION

The present invention relates to a system and a method of controlling operation of a hybrid motor vehicle that takes into consideration the current operating conditions of the vehicle and calculates a demand torque so as to prevent an acceleration torque from being applied too.

A method of controlling operation of a hybrid motor vehicle according to an exemplary embodiment of the present invention may include: setting a creep torque as a minimum torque; setting a maximum torque as the sum of the maximum torque of the engine and the maximum torque of the motor as; monitoring an acceleration pedal position sensor (APS) value; calculating a demand torque according to the APS value; setting a filter coefficient for filtering the demand torque according to the operating conditions of the vehicle; and filtering the demand torque by means of the filter coefficient.

The operating conditions may include at least one of a traction control system (TCS), an electronic stability program (ESP), a state of charge (SOC), a change rate of the APS value, and/or a current drive mode. Illustratively, priorities may be correlated to specific driving conditions, and the filter coefficient may be set according to driving conditions having higher priority.

A system of controlling travel of a motor vehicle according to another exemplary embodiment of the present invention may be applied to the vehicle including an engine and a motor. The system may further include a control portion adapted to control the engine and the motor. The control portion may be adapted to a demand torque according to an APS value and to filter the demand torque by means of a filter coefficient according to the operating conditions of the vehicle. The operating conditions may include at least one of a traction control system (TCS), an electronic stability program (ESP), a state of charge (SOC), a change rate of the APS value, and a current drive mode.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
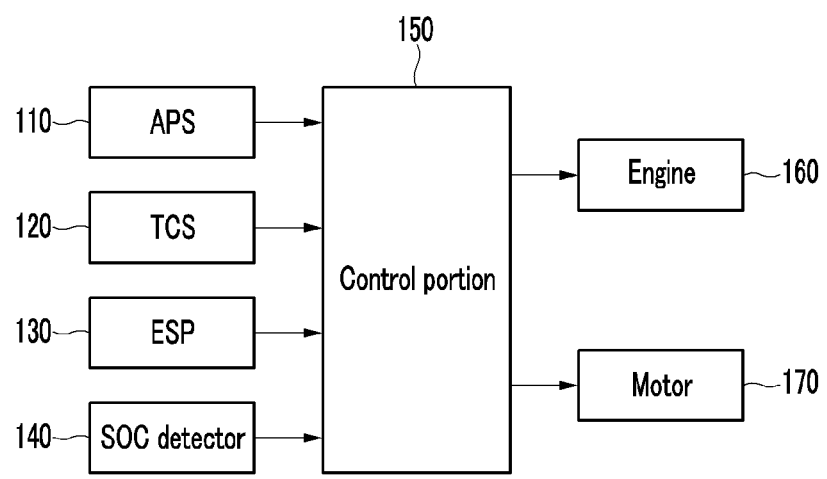
FIG. 2 is a block diagram of a system of controlling travel of a motor vehicle according to an exemplary embodiment of the present invention.

FIG. 2 is a block diagram of a system of controlling motor vehicle operation according to an exemplary embodiment of the present invention. As shown in FIG. 2, a system of controlling motor vehicle operation according to an exemplary embodiment of the present invention includes, but is not limited to, an APS 110, a TCS 120, an ESP 130, a SOC detector 140, a control unit 150, an engine 160, and a motor 170.

The APS 110 detects the position of an accelerator pedal (e.g., the degree of accelerator pedal depression) and delivers a signal corresponding thereto to the control unit 150. If the accelerator pedal is depressed completely, the position of the accelerator pedal is 100%, and if the accelerator pedal is not depressed at all, the position of the accelerator pedal is 0%. A throttle valve opening sensor installed at an intake passage may be used instead of, or in conjunction with, the APS 110. Therefore, it is to be understood that the APS 110 may include the throttle valve opening sensor.

The TCS 120 controls a driving torque of the vehicle. If the TCS 120 is to be controlled, the TCS 120 delivers a signal corresponding thereto to the control unit 150.

The EPS 130 analyzes the position of the steering wheel and promotes stability of the vehicle by applying brake pressure to the wheel, reducing engine torque, or performing gear shifting based on the position of the steering wheel. If the EPS 130 is to be controlled, EPS 130 delivers a signal corresponding thereto to the control unit 150.

The SOC detector 140 detects the SOC of the battery and delivers a signal corresponding thereto to the control portion 150. Instead of directly detecting the SOC of the battery, current and voltage of the battery may also be detected, and the SOC of the battery may be estimated based thereon.

The control portion 150 calculates an acceleration torque based on the signals received from the APS 110, the TCS 120, the EPS 130, and the SOC detector 140, and filters the calculated acceleration torque by using a filter coefficient. In addition, the control unit 150 calculates the engine torque and the motor torque based on the filtered acceleration torque, and controls the engine 160 and the motor 170 based on the engine torque and the motor torque. In other words, the control unit 150 may include one or more processors activated by a predetermined program, and the predetermined program may be programmed to perform each step of a method of controlling motor vehicle operation according to an exemplary embodiment of this invention.

Although the above exemplary embodiment is described as using a plurality of units to perform the above process, it is understood that the above processes may also be performed by a single controller or unit.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 3:
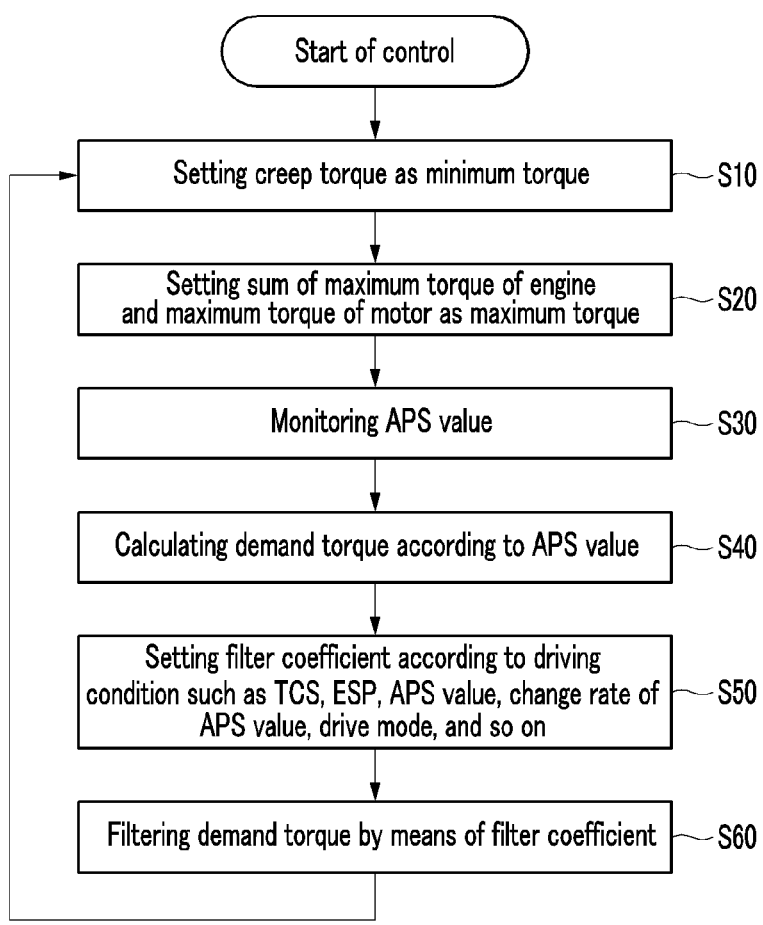
FIG. 3 is a flowchart of a method of controlling operation of a motor vehicle according to an exemplary embodiment of the present invention.
Figure 4:
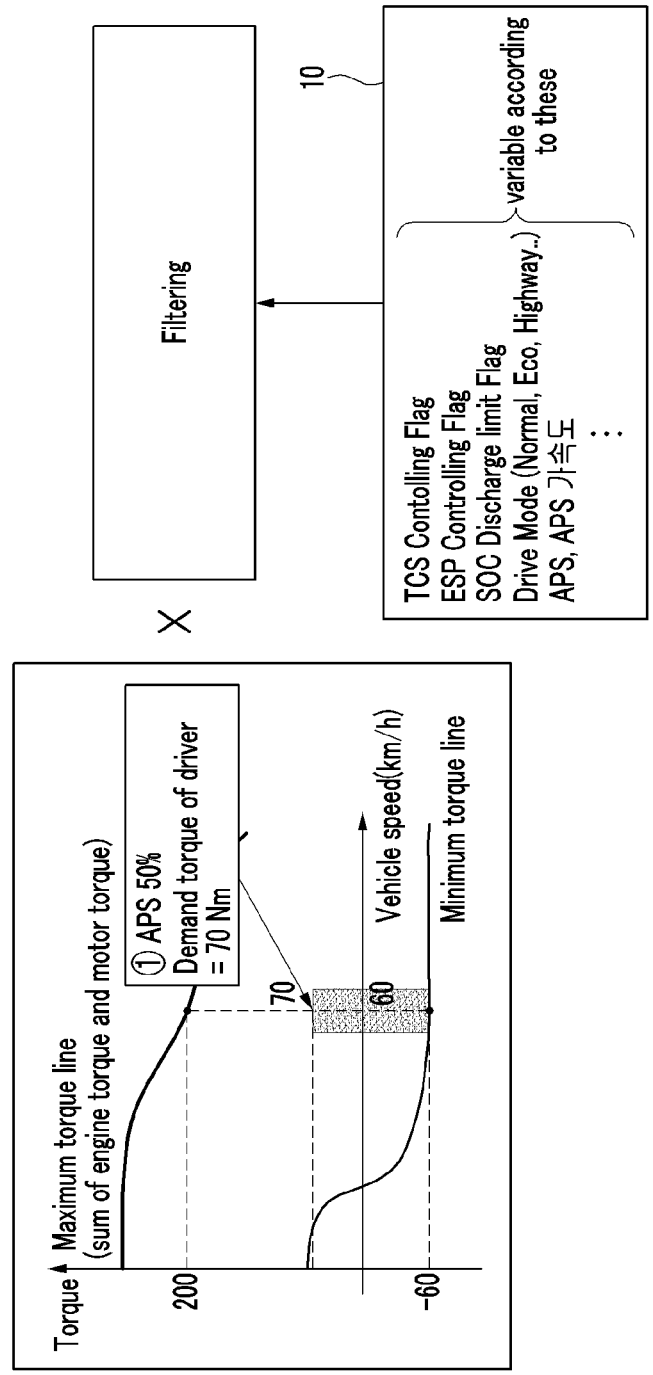
FIG. 4 is a schematic diagram illustrating a method of controlling operation of a motor vehicle according to an exemplary embodiment of the present invention.

FIG. 3 is a flowchart of a method of controlling motor vehicle operation according to an exemplary embodiment of the present invention. As shown in FIG. 3, the method of controlling motor vehicle operation according to an exemplary embodiment of the present invention includes setting a creep torque as a minimum torque at a step S10, setting the maximum torque as a sum of the maximum torque of the engine and the maximum torque of the motor at a step S20, monitoring the acceleration pedal position sensor (APS) value at a step S30, calculating a demand torque according to the APS value at a step S40, setting a filter coefficient (e.g., see FIG. 4, 10) for filtering the demand torque according to the operating conditions of the vehicle at a step S50, and filtering the demand torque by means of the filter coefficient (e.g., see FIGS. 4, 10) at a step S60.

Firstly, the creep torque is set as the minimum torque at step S10. The creep torque refers to the torque that enables vehicle creeping when the accelerator is not depressed. In other words, vehicle creeping refers to the state where a driver does not push the accelerator pedal and the vehicle creeps forward via the idle RPM of the engine or an electric torque of the motor. Vehicle creeping is performed mainly when the road is blocked, or the driver wants to move slowly forward.

The system of controlling motor vehicle operation determines the driver's intention by receiving the signal from the APS and/or a brake switch. Particularly, the system of controlling motor vehicle operation applied to a hybrid vehicle determines a final output torque based on an output torque of the engine 160 and an output torque of the motor 170 according to the SOC of the battery so as to achieve the demand torque of the driver's request. The output torque of the engine 160 is determined by an engine control unit (not shown), and the output torque of the motor 170 is determined by a motor control unit (not shown). The engine control unit and the motor control unit may be controlled by the control unit 150 or be integrated into the control unit 150.

When the hybrid vehicle runs slowly or is stopped and the driver has no intent to accelerate (i.e., the driver does not push the acceleration pedal), use of engine power is minimized so as to generate the creep torque and reduce fuel consumption. Therefore, the engine 160 is stopped and the creep torque is generated by using electric power of the motor 170 when creeping. The creep torque is generated according to the SOC of the battery by the motor, and the SOC of the battery may be decreased if the creeping lasts too long. In this case, the engine 160 may be started again and the battery is charged by the engine 160.

Meanwhile, when the vehicle runs slowly or is stopped and the driver has no intent to accelerate (i.e., the driver does not push the acceleration pedal), the engine 160 may generate the creep torque according to a conventional vehicle engine (e.g., an internal combustion engine). At this time, the engine 160 generates the creep torque so as to minimize use of power.

As a consequence of setting the creep torque as the minimum torque of the system, the vehicle creeping is possible even though the APS value is 0%. After that, the sum of the maximum torque of the engine 160 and the maximum torque of the motor 170 is set as the maximum torque of system at step S20.

As described above, the final output torque may be determined based on the output torque of the engine 160 and the output torque of the motor 170 according to the SOC of the battery in a case of the hybrid vehicle. Therefore, the maximum value of the final output torque is set as the maximum torque of the system.

In the state in which the minimum torque and the maximum torque are set, the APS value is monitored at step S30. In other words, how much the driver pushes the accelerator pedal is continuously monitored by the APS.

The demand torque of the driver may be calculated according to the monitored APS value at step S40. In more detail, the demand torque may be the minimum torque (creep torque) if the APS value is 0%, and the demand torque may be the maximum torque if the APS value is 100%. Therefore, the demand torque of the driver may be calculated according to the APS value.

If the driver pushes the acceleration pedal and the APS value is 50%, the demand torque may be determined between a maximum torque line connecting the maximum torques and a minimum torque line connecting the minimum torque as shown in FIG. 3. For example, the demand torque may be calculated to be 70 Nm. The filter coefficient 10 for filtering the demand torque may be set according to the operating conditions of the vehicle at step S50. In addition, the demand torque may be filtered by using the filter coefficient 10 at the step S60 and travel of the vehicle is controlled. The filter coefficient (e.g., see FIGS. 4, 10) filters the demand torque of the driver so as not to be changed rapidly.

Figure 1:
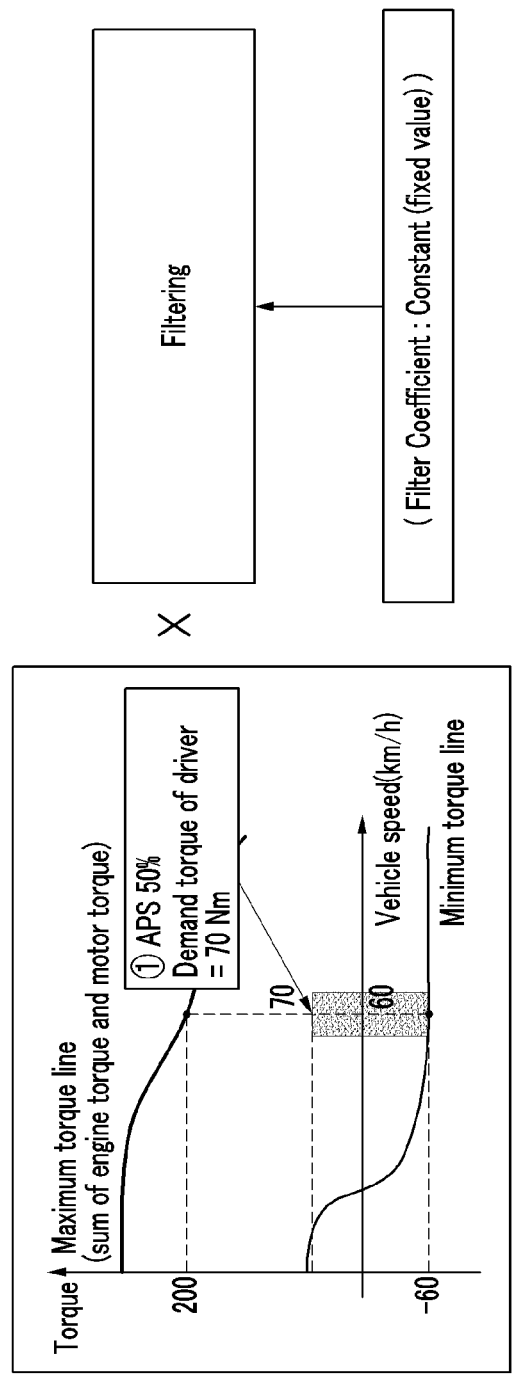
FIG. 1 is a schematic diagram for explaining concept of a method of controlling travel of a motor vehicle according to the conventional art.

As shown in FIG. 1, since the filter coefficient is a constant value in the conventional art, it is difficult to cope with various operating conditions.

As shown in FIG. 3, the filter coefficient 10 (see FIG. 4), however, is changed and set according to the operating condition of the vehicle in an exemplary embodiment of the present invention. Since the filter coefficient 10 is set by reflecting the various operating conditions of the vehicle thereon, it is enhanced to cope with a current driving condition.

The operating conditions include at least one of the TCS, the ESP, the SOC, a change rate of the APS value, and a current drive mode.

In the case where a control flag for the TCS or the ESP is turned on (i.e., control of the TCS or the ESP is necessary), the filter coefficient 10 may be set to a small value such that the demand torque of the driver is changed quickly in one or more exemplary embodiments. If the control flag for the TCS or the ESP control is turned on, the vehicle operating conditions may reflect an emergency situation, or indicate that the vehicle may run into danger. Therefore, the driver's request should be enacted.

In the case where the SOC of the battery is low, the filter coefficient may be set to a large value such that the demand torque changes slowly in one or more exemplary embodiments.

In one or more exemplary embodiments, the filter coefficient may be changed according to the rate of change of the APS value and the driving mode. As indicated above, the state of the TCS, the ESP, the SOC, the change rate of the APS value, and the current drive mode are all non-limiting examples of operating conditions of the vehicle. Therefore, the filter coefficient may also be set according to various operating conditions of the vehicle other than the above-described driving conditions.

Priorities for setting the filter coefficient may be set to various driving conditions including whether the TCS operates, whether the ESP operates, the SOC, the change rate of the APS value, and the current drive mode, and the filter coefficient may be changed and set according to occurrence of the operating conditions associated with a higher priority.

In one or more exemplary embodiments, the operating condition priorities may be set, for example, in a sequence of 1. the TCS or the ESP operates, 2. discharge limit of the battery SOC exists, 3. the vehicle drives in an Eco drive mode, 4. the vehicle drives on a city street, and 5. the vehicle drives on a highway.

When the vehicle, for example, drives on the highway, the filter coefficient 10 may be set corresponding thereto and the demand torque may be filtered by the filter coefficient 10 so as to correspond to driving on the highway. For example, consider the situation where the TCS or the ESP of the vehicle operates due to the presence of obstacles on the road. In this case, since operation of the TCS or the ESP has a higher priority than driving on the highway, the demand torque may be filtered by applying the filter coefficient 10 corresponding to the operation of the TCS or the ESP. Therefore, the driver's request may be immediately translated to the operation of the vehicle, and the vehicle can avoid the emergency.

The control unit 150 divides the filtered demand torque to the engine 160 and the motor 170. If the maximum torque that can be output from the engine 160 is Tm,eng and the maximum torque that can be output from the motor 170 is Tm,mot, the torque Teng divided to the engine 160 and the torque Tmot divided to the motor 170 are calculated by following equations.

$$Teng = T * Tm,eng / (Tm,eng + Tm,mot)$$

$$Tmot = T * Tm,mot / (Tm,eng + Tm,mot)$$

Herein, T indicates the demand torque of the vehicle.

If the torques divided to the engine 160 and the motor 170 are calculated, the control unit 150 controls the engine 160 and the motor 170 based thereon.

An actual test of the system and the method according to an exemplary embodiment of the present invention to the hybrid vehicle showed that safety and fuel economy were improved by setting the filter coefficient according to the various driving conditions and changing the demand torque of the driver. Since the filter coefficient may be changed according to the current operating condition of the vehicle according to an exemplary embodiment of the present invention, the driving condition of the vehicle is fully reflected on the demand torque, and thus safety may be improved. Since rapid change of the acceleration torque is prevented by changing the filter coefficient according to the current operating condition of the vehicle, fuel economy may also be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling motor vehicle operation, comprising:
    setting, by a control unit, a creep torque as a minimum torque;
    setting, by the control unit, a maximum torque as a sum of a maximum torque of an engine and a maximum torque of a motor;
    monitoring, by the control unit, a pedal position sensor (PPS) value;
    calculating, by the control unit, a demand torque based on the PPS value;
    setting, by the control unit, a filter coefficient for filtering the demand torque based on an operating condition of the vehicle; and
    filtering, by the control unit, the demand torque with the filter coefficient,
    wherein the operating condition is selected from the group consisting of a traction control system (TCS), an electronic stability program (ESP), a state of charge (SOC), a rate of change of an accelerator pedal position sensor (APS) value, a rate of change of a brake pedal position sensor (BPS) value, and a current driving mode,
    wherein when a control flag for the ESP is turned on, the filter coefficient is set to a minimal value to rapidly change the demand torque,
    wherein when the SOC is substantially low, the filter coefficient is set to a larger value to decrease the change of the demand torque,
    wherein each possible operating condition is assigned a priority value,
    wherein the filter coefficient is set to correspond to the operating conditions with highest priority values, and
    wherein the operating condition with the highest priority value is the ESP.

2. The method of claim 1, wherein the pedal position sensor is the accelerator pedal position sensor (APS).

3. The method of claim 1, wherein the pedal position sensor is the brake pedal position sensor (BPS).

4. A system of controlling hybrid motor vehicle operation, comprising:
    an engine;
    a motor;
    one or more operation condition sensors configured to produce sensor values; and
    a control unit,
    wherein the control unit is adapted to control the engine and the motor, and to select a demand torque based on one or more of the sensor values,
    wherein the control unit is further configured to filter the demand torque using a filter coefficient according to the one or more operation condition sensor values,
    wherein the one or more operation condition sensors are selected from the group consisting of a traction control system (TCS), an electronic stability program (ESP), a state of charge (SOC), a rate of change of an accelerator pedal position sensor (APS) value, a rate of change of a brake pedal position sensor (BPS) value, and a current driving mode,
    wherein when a control flag for the ESP is turned on, the filter coefficient is set to a minimal value to rapidly change the demand torque,
    wherein when the SOC is substantially low, the filter coefficient is set to a larger value to decrease the change of the demand torque,
    wherein the control unit is further configured to assign a priority value to each operation condition sensor value,
    wherein the filter coefficient corresponds to the operation condition sensor value having the higher priority value, and
    wherein the operating condition with the highest priority value is the ESP.

* * * * *